United States Patent
Tzeng et al.

(10) Patent No.: US 9,727,749 B2
(45) Date of Patent: Aug. 8, 2017

(54) LIMITED-ACCESS FUNCTIONALITY ACCESSIBLE AT LOGIN SCREEN

(71) Applicant: Microsoft Technology Licensing, LLC, Redmond, WA (US)

(72) Inventors: Jack Tzeng, London (GB); Yinghua Yao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 14/733,608

(22) Filed: Jun. 8, 2015

(65) Prior Publication Data

US 2016/0357981 A1    Dec. 8, 2016

(51) Int. Cl.
*G06F 21/00* (2013.01)
*G06F 21/62* (2013.01)

(52) U.S. Cl.
CPC ........ *G06F 21/6218* (2013.01); *G06F 21/629* (2013.01); *G06F 2221/2105* (2013.01)

(58) Field of Classification Search
CPC .................................................. G06F 21/6218
See application file for complete search history.

(56) References Cited

U.S. PATENT DOCUMENTS

| | | |
|---|---|---|
| 8,331,992 B2 | 12/2012 | Stallings et al. |
| 8,434,153 B2 | 4/2013 | Sundaramurthy et al. |
| 8,464,350 B2 | 6/2013 | Kanevsky et al. |
| 8,660,531 B2 | 2/2014 | Hymel |
| 8,782,799 B2 | 7/2014 | Phillips et al. |
| 9,037,682 B2 * | 5/2015 | Das ........................ H04L 65/602 709/219 |
| 9,298,301 B2 * | 3/2016 | Tsai ........................ G06F 3/0412 |
| 9,372,571 B2 * | 6/2016 | Williams .............. G06F 3/0416 |
| 9,424,417 B2 * | 8/2016 | Brown ..................... G06F 21/44 |
| 2005/0198319 A1 | 9/2005 | Chan et al. |

(Continued)

FOREIGN PATENT DOCUMENTS

EP    2469816 A1    6/2012

OTHER PUBLICATIONS

Ben Woods;"Start for Android is a Versatile Lock Screen Replacement with More than Just Looks"; Published: May 27, 2014 Available at: http://thenextweb.com/apps/2014/05/27/start-android-versatile-lock-screen-replacement-just-looks/.

(Continued)

*Primary Examiner* — Ali Shayanfar

(57) ABSTRACT

Techniques and technologies for providing limited-access functionality accessible at a "login screen" (or "lock screen") of a device are described. In at least some embodiments, a system includes a user interface operatively coupled to a processing component; and one or more instructions stored on a memory that, when executed by the processing component, are configured to: (a) generate a login portion displayed on the user interface, the login portion configured to receive at least one user access credential to determine whether to provide access to one or more authorized-access functionalities; and (b) generate a limited-access functionality access portion displayed on the user interface concurrently with the login portion, the limited-access functionality access portion configured to provide access to at least one limited-access functionality without requiring receipt of the at least one user access credential.

15 Claims, 7 Drawing Sheets

(56) References Cited

U.S. PATENT DOCUMENTS

| | | | |
|---|---|---|---|
| 2010/0159995 A1* | 6/2010 | Stallings | G06F 3/0488 455/566 |
| 2010/0229226 A1* | 9/2010 | Yasrebi | G06F 21/335 726/6 |
| 2010/0306705 A1 | 12/2010 | Nilsson | |
| 2010/0306773 A1 | 12/2010 | Lee et al. | |
| 2010/0318569 A1* | 12/2010 | Munday | G06F 21/6227 707/783 |
| 2012/0084734 A1* | 4/2012 | Wilairat | G06F 21/36 715/863 |
| 2012/0272230 A1 | 10/2012 | Lee | |
| 2012/0284297 A1 | 11/2012 | Aguera-Arcas et al. | |
| 2012/0324225 A1* | 12/2012 | Chambers | H04L 9/0891 713/169 |
| 2013/0312083 A1* | 11/2013 | Farraro | G06F 21/31 726/16 |
| 2014/0223482 A1* | 8/2014 | McIntosh | G11B 27/105 725/41 |
| 2014/0283012 A1 | 9/2014 | Eggerton et al. | |
| 2015/0033361 A1 | 1/2015 | Choi et al. | |
| 2015/0150122 A1* | 5/2015 | Son | G06F 21/34 726/20 |
| 2015/0161837 A1* | 6/2015 | Smith | G07C 9/00158 340/5.53 |
| 2015/0235018 A1* | 8/2015 | Gupta | G06F 21/36 726/19 |
| 2015/0294098 A1* | 10/2015 | Suwa | G06F 21/32 726/19 |
| 2015/0350411 A1* | 12/2015 | Blom | H04W 12/06 455/411 |
| 2016/0050209 A1* | 2/2016 | Govande | H04L 63/101 726/7 |
| 2016/0066140 A1* | 3/2016 | Gnanasekaran | H04W 4/021 455/456.3 |
| 2016/0180078 A1* | 6/2016 | Chhabra | G06F 21/31 726/19 |
| 2016/0300045 A1* | 10/2016 | Nyshadham | G06F 21/31 |

OTHER PUBLICATIONS

"Picturesque Lock Screen"; Published Feb. 20, 2015 Available at: https://play.google.com/store/apps/details?id=com.microsoft.androidapps.picturesque.

"Use Widgets on Lock Screen"; Retrieved on: Mar. 3, 2015 Available at: https://support.google.com/playedition/answer/2781801?hl=en.

David Nield; "16 Things You Can Do In Android Lollipop That You Couldn't Do In KitKat"; Published on: Nov. 17, 2014 Available at: http://fieldguide.gizmodo.com/16-things-you-can-do-in-android-lollipop-that-you-could-1659628014.

"International Search Report and Written Opinion Issued in PCT Application No. PCT/US2016/035944", Mailed Date: Sep. 7, 2016, pp. 10.

"Second Written Opinion Issued in PCT Application No. PCT/US2016/035944", dated May 9, 2017, 5 Pages.

* cited by examiner

LIMITED-ACCESS FUNCTIONALITY ACCESSIBLE AT LOGIN SCREEN

BACKGROUND

People use a variety of devices to obtain information they need to facilitate their daily lives, such as conducting searches as part of their employment duties, or for personal reasons such as seeking out a restaurant or obtaining driving directions. For example, using a mobile telephone, tablet, laptop, desktop, or other device, a person may enter their login credentials to obtain access to the device, open a web-browser (or other suitable application), and enter a desired search criteria. The search results are typically displayed, and the person may select and review several of the displayed results before making a final selection, or may enter new search criteria to perform a new search. During such browsing operations, information regarding the person's activities may be temporarily stored in memory for quick retrieval (e.g. cache), and may also be stored in more permanent (or semi-permanent) memory for later retrieval and access.

In some situations, it may be desirable to allow a second person to have access a device that is owned by (or dedicated to) a first person. For example, a person who is driving an automobile may wish to allow a passenger to use the driver's cellular telephone to perform a search (e.g. to obtain driving directions), or an employee of a company may wish to allow a visitor to use the employee's desktop or laptop computer to search for information. In such cases, the driver (or employee) may enter their login credentials to obtain access to the device, and may then give the device to the passenger (or visitor) to perform the other necessary operations (e.g. open a web-browser, enter a desired search criteria, etc.). Although desirable results have been achieved using such conventional techniques, there is room for improvement.

SUMMARY

In at least some embodiments, a system having a limited-access functionality accessible at a login screen may include a processing component operatively coupled to a memory; a user interface operatively coupled to the processing component; and one or more instructions stored on the memory that, when executed by the processing component, are configured to cause one or more operations including: (a) generate a login portion displayed on the user interface, the login portion configured to receive at least one user access credential to determine whether to provide access to one or more authorized-access functionalities; and (b) generate a limited-access functionality access portion displayed on the user interface concurrently with the login portion, the limited-access functionality access portion configured to provide access to at least one limited-access functionality without requiring receipt of the at least one user access credential, the at least one limited-access functionality being at least one of (i) a subset of the one or more authorized-access functionalities, or (ii) having access to less data stored in the memory than the one or more authorized-access functionalities.

In at least some alternate embodiments, a system may include a user interface; and a processing component operatively coupled to the user interface and configured to: perform a plurality of authorized-access functionalities, the plurality of authorized-access functionalities including at least one limited-access functionality, the at least one limited-access functionality being a subset of the plurality of authorized-access functionalities; operate the user interface to display a login portion configured to provide a query for at least one user access credential; and operate the user interface to display a limited-access functionality access portion concurrently with the display of the login portion, the limited-access functionality access portion configured to provide a query for at least one limited-access input for the at least one limited-access functionality without requiring receipt of the at least one user access credential.

In a further embodiment, a system includes a user interface and a processing component operatively coupled to the user interface and configured to: operate the user interface to display a user input prompt; operate the user interface to receive an input; determine whether the input includes at least one authorized-access credential or at least one limited-access input for performing at least one limited-access functionality; and based at least partially on the determination: if the input includes at least one authorized-access credential, attempt to verify the at least one authorized-access credential before providing access to one or more authorized-access functionalities; and if the input includes at least one limited-access input for performing at least one limited-access functionality, provide the at least one limited-access input to the at least one limited-access functionality without requiring receipt of at least one authorized-access credential.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for providing limited-access functionality accessible at a login screen. Such techniques and technologies may be implemented in a wide variety of systems and environments, including desktop computers, laptop computers, cellular telephones, tablets, Personal Data Assistants (PDAs), or any other suitable types of systems. As described more fully below, techniques and technologies for providing limited-access functionality accessible at a login screen may advantageously improve system operating efficiencies and performance, reduce resource usage, and reduce the risk of unauthorized system use and unauthorized access of information in comparison with conventional techniques and technologies.

Figure 1:
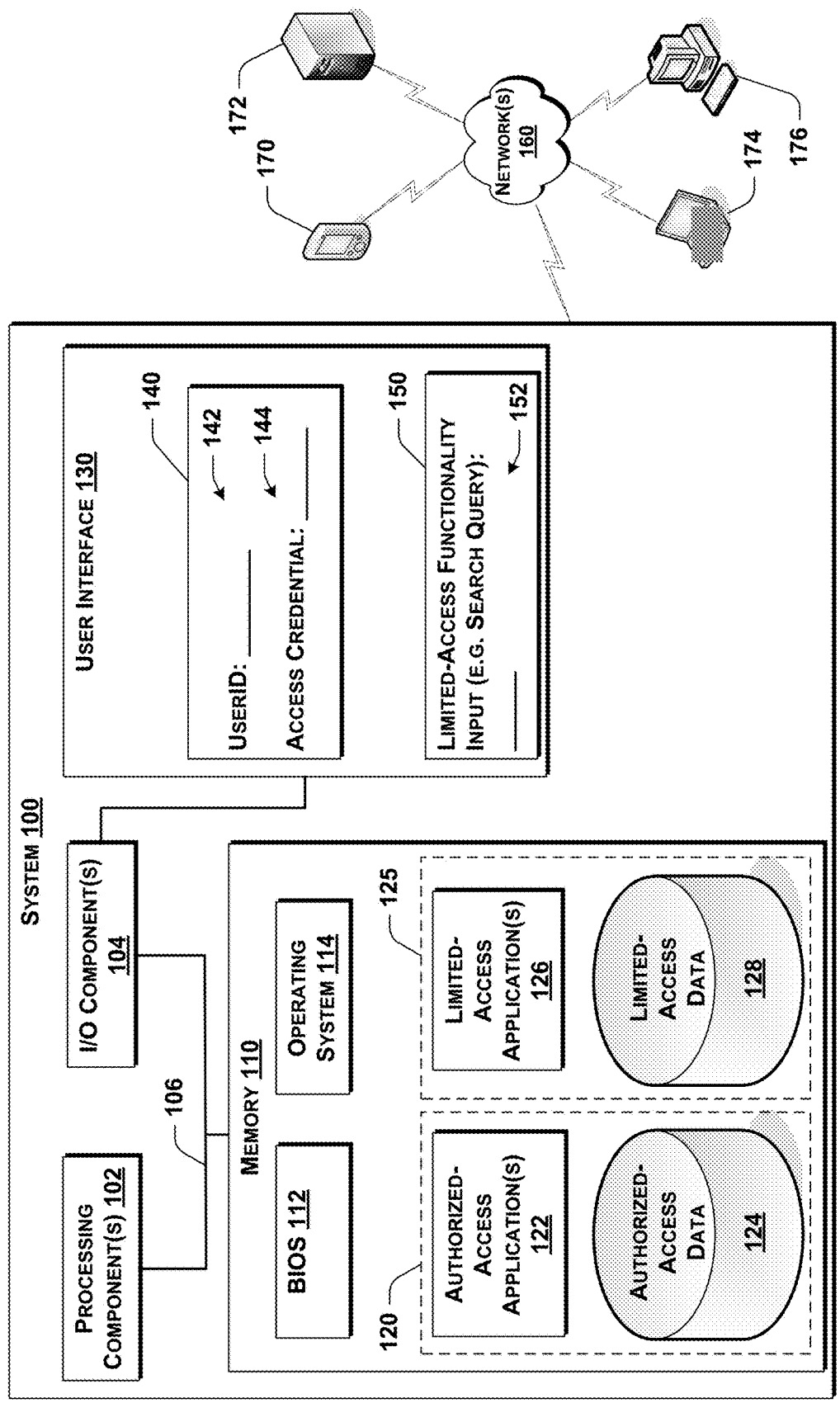
FIG. 1 shows an embodiment of a system for providing limited-access functionality accessible at a login screen.

FIG. 1 shows an embodiment of a system 100 for providing limited-access functionality accessible at a login screen. In this embodiment, the system 100 includes one or more processing components 102 and one or more input/output (I/O) components 104 coupled to a memory 110 by a bus 106. The memory 110 includes a basic input/output system (BIOS) 112, which provides basic routines that help to transfer information between elements within the system 100, and an operating system 114 that manages and provides common services to the various elements of the system 100.

In the embodiment shown in FIG. 1, the memory 110 also includes an authorized-access portion 120 bearing one or more authorized-access applications 122 (e.g. email applications, text messaging applications, financial applications, proprietary applications, etc.) and authorized-access data 124 (e.g. stored messages, contact lists, browsing history, bank balances, proprietary information, etc.). Similarly, the memory 110 includes a limited-access portion 125 bearing one or more limited-access applications 126, and may also include limited-access data 128. In some embodiments, the authorized-access portion 120 and the limited-access portion 125 of the memory 110 may be separate memory devices. In other embodiments, the authorized-access portion 120 and the limited-access portion 125 may simply be separate portions located on the same memory device(s).

The system 100 further includes a user interface 130 operatively coupled to the one or more input/output (I/O) components 104. In some embodiments, the user interface 130 may be a conventional display, and inputs to the system 100 may be accomplished via the one or more I/O components 104 (e.g. keypad, pointing device, microphone, optical sensor, audio sensor, contact sensor, pressure sensor, electromagnetic sensor, camera, imaging device, etc.), while in other embodiments, the user interface 130 may be a touchscreen display, a contact-sensitive display, an interactive display, or any other suitable interface type configured to at least one of provide information to or receive information from a user or user-related device.

In at least some embodiments, the user interface 130 may include one or more aspects of a Natural User Interface (NUI) that enables a user to interact with the system 100 in a "natural" manner, free from artificial constraints imposed by conventional input devices such as mice, keyboards, remote controls, and the like. For example, in at least some embodiments, an NUI may rely on speech recognition, touch and stylus recognition, gesture recognition both on screen and adjacent to the screen, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), gestures, machine intelligence (e.g. pattern recognition, Bayesian learning algorithms, inductive learning algorithms, inference algorithms, etc.), as well as technologies for sensing brain activity using electric field sensing electrodes (electroencephalogram (EEG) techniques and related methods) to receive inputs to the system 100.

It will be appreciated that the illustrative system 100 represents a variety of possible system types, including but not limited to a desktop computer, laptop computer, cellular telephone, tablet, Personal Data Assistant (PDA), or any other suitable type of system. As shown in FIG. 1, the system 100 may communicate with one or more other devices (e.g. via I/O components 104), either directly or indirectly via one or more networks 160 (e.g. cellular network, global communication network, Local Area Network (LAN), Wide Area Network (WAN), wired or wireless network, etc.), including, for example, a hand-held communication device 170 (e.g. cellular telephone, tablet, PDA, etc.), a server device 172, a mobile computing device 174 (e.g. laptop, notebook, etc.), a desktop computing device 176, or any other suitable device.

In the embodiment shown in FIG. 1, the user interface 130 displays what is generally referred to as a "login screen" that includes a login access (or "authorized-access") portion 140 and a limited-access functionality access portion 150. Alternatively, the information displayed by the user interface 130 in FIG. 1 may be referred to as a "lock screen," or may be referred to by any other suitable name or designation. In at least some embodiments, the user may provide input to the login access portion 140 or to the limited-access functionality access portion 150 in a variety of ways, including by manually inputting alphanumeric characters (e.g. typing, keying, etc.), by audibly speaking the inputs (e.g. via voice recognition applications, Cortana™, etc.), by gestures (e.g. waving, pointing, etc.), by providing one or more biometric inputs (e.g. fingerprint, retinal pattern, iris pattern, mouth or other facial pattern, voice recognition, other physiological characteristics or information, etc.), by providing inputs (manually or automatically) from a user-related device (e.g. a wireless signal from a fob, a communication device, an access device, an identifying device, etc.), or by any other suitable techniques that enable input to be provided by a user or a user-related device.

The login access portion 140 enables a user to provide one or more login credentials to gain access to the full functionality (or set of functionalities) of the system 100. For example, in some embodiments, the login access portion 140 may include a user identification portion 142 through which a user provides an identifying input (e.g. username, user identification, etc.), and also a confidential input portion 144 through which the user provides a confidential input to complete their login (e.g. password, Personal Identification Number (PIN), etc.). In alternate embodiments, the login access portion 140 may only require a single login credential (e.g. password, PIN, biometric input, etc.), such as when the full functionality of the system 100 is only accessed by a single owner or user.

Similarly, the limited-access functionality access portion 150 of the user interface 130 includes a limited-access functionality input 152 that is configured to receive an input for performing a limited-access functionality (or for accessing limited-access data). By accessing the system 100 via the limited-access functionality access portion 150, a user may only be permitted to access a more limited functionality (or set of functionalities) of the system 100. More specifically, a user who accesses the system 100 through the limited-access functionality access portion 150 (hereinafter "limited-access user") may only gain access to the limited-access portion 125 of the memory 110, which in the embodiment shown in FIG. 1 includes the one or more limited-access applications 126 and the limited-access data 128. Such a limited-access user is denied access to the authorized-access portion 120 of the memory 110, including the one or more authorized-access applications 122 and the authorized-access data 124. On the other hand, a user who accesses the system 100 via the login access portion 140 (hereinafter "authorized user") may be allowed to access a more comprehensive set of functionalities of the system 100, such as the one or more authorized-access applications 122 (e.g. email applications, text messaging applications, cameras, image capturing applications, financial applications, etc.) and the authorized-access data 124 (e.g. stored messages, contact lists, browsing history, bank balances, etc.).

The term "limited-access application" (or "limited-access functionality) refers to an application (or functionality) that is available to a user who accesses the system 100 through the limited-access functionality access portion 150 of the user interface 130 rather than the login access (or "authorized-access") portion 140 of the user interface 130. It will be appreciated that the term "limited-access application" (or "limited-access functionality") may refer to an application (or functionality) having no limits on its intended functionality (i.e. having unrestricted capability), or alternately, may refer to an application that is in some way restricted (e.g. a search engine that is limited to a limited number of websites or limited information, a telephone that does not permit long-distance or international calls, a telephone that only permits intra-company calls, an application that is only available for a limited time period, limited number of uses, limited data usage, etc.). In other words, if an application (or functionality) is available as both a "limited-access application" and as an "authorized-access application", the "limited-access" application (or "limited-access" functionality) may have the same capability when it is accessed via the limited-access functionality access portion 150 as its "authorized-access" counterpart that is accessed via the login access portion 140, or it may have a reduced or limited capability relative to its "authorized-access" counterpart.

For example, in a representative embodiment, the system 100 may be a cellular telephone owned by a driver of a vehicle, and the limited-access functionality input 152 may be configured to receive a search query to an Internet search engine. The driver may provide the system 100 to a passenger so that the passenger can search for driving directions to a restaurant. The passenger may use the system 100 as a limited-access user and simply enter a desired search query into the limited-access functionality input 152 of the user interface 130. In response, the system 100 may provide the desired search query to one or more of the limited-access applications 126 (e.g. Microsoft's BING® application, YAHOO!® Search, Google®, etc.) to conduct the Internet search for driving directions to the restaurant. After the appropriate limited-access application(s) 126 conducts the Internet search, the system 100 may provide one or more search results via the user interface 130, such as by displaying the driving directions for visual inspection, or by audibly providing the driving directions, or both.

In some embodiments, some or all of the information associated with the limited-access user's use of the limited functionality access 150 of the system 100 may be stored as limited-access data 128 in the limited-access portion 125 of the memory 110. For example, using the illustrative example set forth above, the passenger's desired search query, or the search results, or the web pages accessed by the limited-access user during review of the search results, or during other browsing operations, or other information associated with the passenger's use of the limited functionality access 150 of the system 100 (e.g. time of access, location, period of use, provenance data such as, for example, identity of user, creator, accessor, or modifier of data, etc.) may be stored in the limited-access data 128. This information may then be available for retrieval by the system 100, such as if another user (limited-access user or authorized user) attempts to conduct the same search (e.g. to obtain driving directions to the same restaurant). In other embodiments, however, none of the information associated with the limited-access user's use of the limited functionality access 150 of the system 100 is stored in the memory 110.

It will be appreciated that techniques and technologies for providing limited-access functionality accessible at a login screen of a system may provide substantial operational improvements in comparison with conventional operations. For example, because a system that provides limited-access functionality accessible at a login screen may allow a user to obtain immediate access to a desired limited-access functionality (or set of limited-access functionalities) of the system, an authorized user of the system is not required to first enter login credentials and start the desired functionality before the desired limited-access operations can be performed. Because the operations associated with accepting and verifying access credentials are eliminated for users who wish to use the system's limited-access functionality (or set of limited-access functionalities), the system may operate more efficiently with fewer computational operations required to achieve the desired result, and with reduced resource usage (e.g., less memory usage, less power consumption, etc.) in comparison with conventional techniques and technologies.

In addition, techniques and technologies for providing limited-access functionality accessible at a login screen of a system advantageously enable an authorized user of the system (e.g. owner, primary or designated user, etc.) to allow another user to use the system as a limited-access user without allowing access to the authorized user's one or more authorized access applications 122 (e.g. email applications, text messaging applications, financial applications, etc.) and authorized-access data 124 (e.g. stored messages, contact lists, browsing history, bank balances, etc.). Thus, an authorized user may lend the system 100 to a limited-access user with less risk of unauthorized use or compromise of confidential information.

Figure 2:
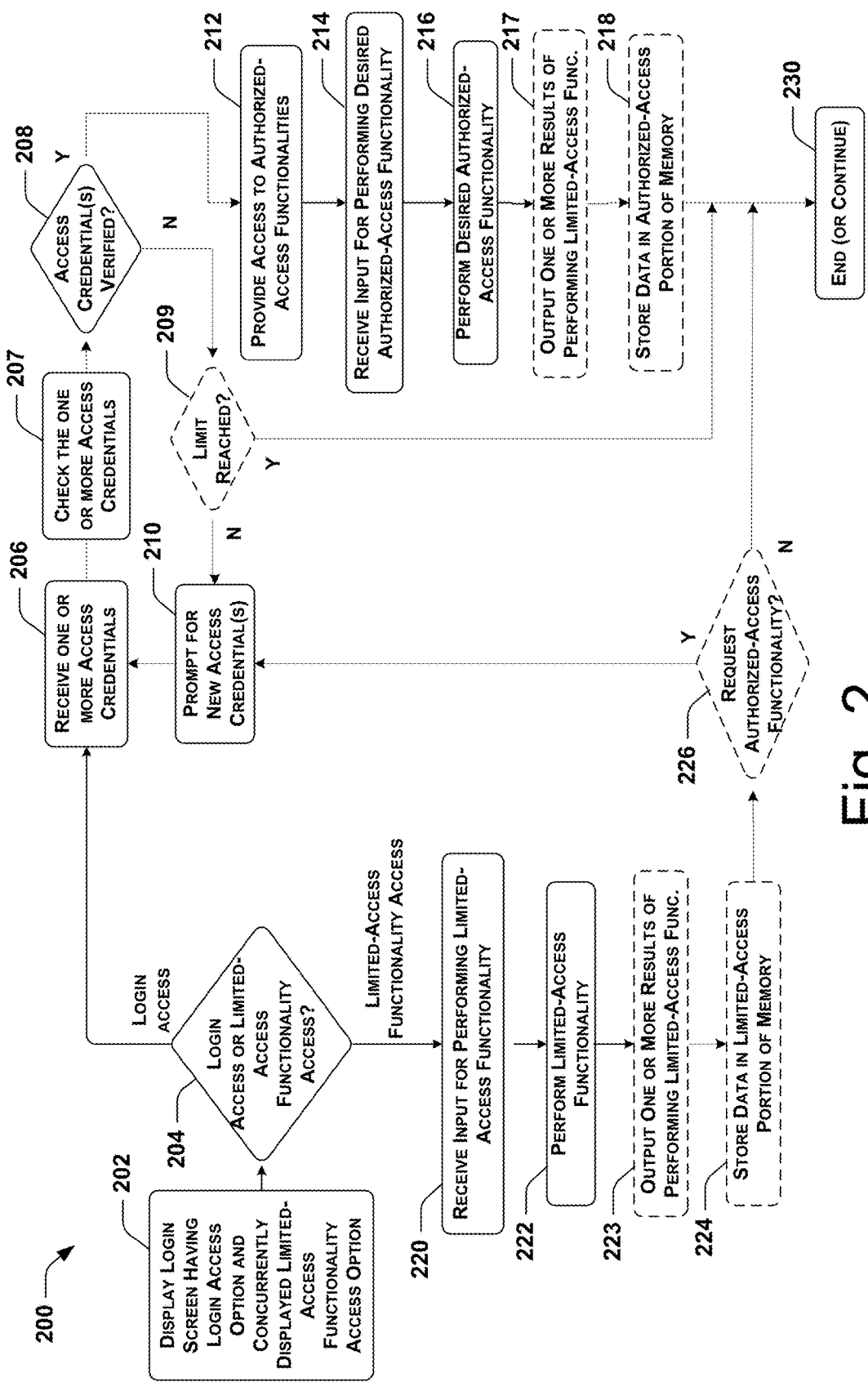
FIG. 2 shows an embodiment of a process for providing limited-access functionality accessible at a login screen.

FIG. 2 shows an embodiment of a process 200 for providing limited-access functionality accessible at a login screen (or "lock screen") of a system (e.g. system 100 of FIG. 1). In this embodiment, the process 200 includes displaying a login screen having a login access option and a limited-access functionality access option concurrently displayed with the login access option at 202. As noted above, the login access option queries a user for one or more login credentials to gain access to a greater functionality (or set of functionalities) of the system, while the limited-access functionality access option provides immediate access to one or more limited-access functionalities of the system. Next, a determination is made whether the authorized access option or the limited-access functionality access option has been selected at 204.

When it is determined that the login access option has been selected (at 204), such as by detecting that the user has started to enter an alphanumeric string in the login access option of the login screen, the process 200 includes receiving one or more access credentials at 206. As noted above, the one or more access credentials received (at 206) may be a single access credential (e.g. a PIN, password, alphanumeric sequence, biometric input, etc.) or a plurality of access credentials (e.g. username and password, user id and PIN, etc.). The one or more access credentials are checked at 207, such as by comparing the received access credentials with one or more reference values stored in memory, and a determination is made at 208 whether the one or more access credentials are successfully verified so that authorized access may be granted. If the one or more access credentials are not successfully verified (at 208), then the process 200 prompts the user for one or more new access credentials at 210, and then returns to receiving one or more access credentials at 206, checking the one or more access credentials at 207, and determining whether the one or more access credentials are verified at 208. These operations (prompting at 210, receiving at 206, checking at 207, determining at 208) may be repeated (either a fixed or variable number of iterations or indefinitely) until the access credentials are successfully verified or until a limit of unsuccessful login attempts has been reached. For example, in at least some embodiments, after the access credentials are not successfully verified (at 208), the process 200 may determine at 209 whether a limit has been reached as to a maximum number of unsuccessful login attempts (e.g. only four unsuccessful login attempts allowed). If it is determined (at 209) that a limit has not been reached, then the operations involved in prompting at 210, receiving at 206, checking at 207, and determining at 208 may be repeated. On the other hand, if a limit has been reached (at 209), then the process 200 may end or continue to other operations at 230.

When the access credentials are successfully verified (at 208), the process 200 provides access to one or more authorized-access functionalities at 212. As noted above, the one or more authorized-access functionalities may involve one or more authorized-access applications or authorized-access data that may be appropriate for use by an authorized user of a system. For example, such authorized-access applications may include communication applications (e.g. email applications, text messaging applications, etc.), or applications that provide access to personal or proprietary information (e.g. accounting applications, banking applications, proprietary applications, etc.), or simply any other application that an owner or designated user of a system may desire to categorize as an authorized-access application. Similarly, such authorized-access data may include stored messages (e.g. emails, texts, instant messages, etc.), contact lists (e.g. telephone lists, client lists, social networking friends, etc.), records of activities (e.g. browsing history, journal, logging program, etc.), personal or proprietary information (e.g. bank balances, credit card numbers, passwords, proprietary information, etc.), or any other information that an owner or designated user of a system may desire to categorize as authorized-access data.

In at least some embodiments, most or all functionalities and data of a system may initially be categorized (e.g. by default) as being "authorized-access" only, and after such an initial or default categorization, an authorized-access user (e.g. an owner or designated user of a system) may choose to designate one or more functionalities or data as being available to limited-access users. Conversely, in at least some other embodiments, most or all functionalities and data of a system may initially be categorized (e.g. by default) as being available to all users, and an authorized-access user may selectively designate one or more functionalities or data as being "authorized-access" only. Of course, in still other embodiments, a system may have some functionalities and data designated as "authorized-access" only, and other functionalities and data available to all users.

As further shown in FIG. 2, input is received (e.g. from an authorized-access user) for performing a desired authorized-access functionality at 214. For example, the authorized-access user may invoke an email messaging application and enter a message to be sent to one or more desired recipients. The desired functionality is then performed at 216 (e.g. the message is sent to the desired recipients). With reference to FIG. 1, the authorized-access functionality performed at 216 may involve communications with one or more other devices (e.g. devices 170 through 176), either directly or indirectly via one or more networks 160.

In at least some embodiments, the process 200 may optionally include outputting one or more results of the limited-access functionality at 217. For example, in some embodiments, the limited-access functionality performed at 216 may involve performing one or more calculations (e.g. related to accounting operations, banking operations, etc.), and the results of those calculations may be displayed at 217. Similarly, the process 200 may optionally including storing data in an authorized-access portion of memory at 218 (e.g. storing calculation results in a database, storing a message in a folder of sent messages, storing browser history, time of access, location, period of use, provenance data, etc.). Although the storage of data (at 218) is shown in FIG. 2 as occurring after the performance of the desired functionality (at 216), it will be appreciated that, in at least some embodiments, the data storage may occur at any other suitable portion of the process 200, including during or even before the performance of the desired functionality (at 216). The process 200 may then end or continue to other operations at 230.

Returning now to the determination at 204 of FIG. 2, if it is determined (at 204) that the limited-access functionality access option has been selected, then the process 200 receives input for performing a desired limited-access functionality at 220 (e.g. receiving a search query for driving directions). As noted above, since one or more limited-access functionalities of the system are presented via the limited-access functionality option at the login screen (at 202), the system may immediately receive input (e.g. from a limited-access user) for performing a desired limited-access functionality at 220 without requiring several of the operations described above for providing access to the system for an authorized-access user (e.g. eliminating operations 206 through 212). For example, in some embodiments, the one or more limited-access functionalities presented at the login screen may include an Internet search functionality (or intranet search, web search, etc.), a telephone functionality, a weather (or weather forecast) checking functionality, a stock market checking functionality, a company telephone directory, a personnel locator, a map functionality, or any other functionality that is deemed suitable as a limited-access functionality of the system.

With continued reference to FIG. 2, the limited-access functionality is performed at 222 (e.g. an Internet search engine conducts an Internet search for driving directions). As described above with respect to FIG. 1, the limited-access functionality performed at 222 may involve communications with one or more other devices (e.g. devices 170 through 176), either directly or indirectly via one or more networks 160. Optionally, the process 200 may output one or more results of performing the limited-access functionality at 223 (e.g. displaying driving directions, displaying search results, etc.). Similarly, in at least some embodiments, the process 200 may optionally store data in a limited-access portion of memory at 224 (e.g. search query, search results, web pages, browsing history, inputs from limited-access user, time of access, etc.).

In at least some embodiments, a limited-access user who has requested to perform a limited-access functionality (at 222) may subsequently request to perform an authorized-access functionality (e.g. saving a file to the local machine, transmitting a search result link to another device, attempting to access authorized-access data, etc.). In such a case, as shown in FIG. 2, the process 200 may optionally include determining whether an authorized-access functionality has been requested at 226. If an authorized-access functionality has been requested (at 226), then the process 200 may return to prompting the user for one or more access credentials at 210 (e.g. providing a pop-up window, re-displaying the login window, etc.) in order to provide (or deny) the requested authorized-access functionality. More specifically, after prompting the user for one or more access credentials 210, the process 200 may proceed to the above-described operations associated with prompting the user for one or more access credentials (at 210), receiving the one or more access credentials (at 206), checking the one or more access credentials (at 207), and verifying the one or more access credentials (at 208), before providing the requested authorized-access functionality (at 212). If it is determined (at 226), however, that an authorized-access functionality has not been requested, the process 200 may end or continue to other operations at 230.

As noted above, techniques and technologies for providing limited-access functionality accessible at a login screen may advantageously provide substantial operational improvements in comparison with conventional technologies. With reference to FIG. 2, by providing limited-access functionality accessible at a login screen of a system, a user of the system is not required to first enter login credentials and start the desired limited-access functionality before the desired limited-access operations can be performed, thereby eliminating several operations associated with receiving and verifying a user's access credentials (e.g. eliminating at least operations 206 through 212 of FIG. 2). These efficiencies may be realized by both a guest to the system (e.g. limited-access user), and also by an owner or designated user of the system (e.g. an authorized-access user) who simply wishes to quickly and efficiently access one or more of the limited-access functionalities provided on the login screen (or lock screen). The system may therefore operate more efficiently with fewer computational operations required to achieve the desired result, and with reduced resource usage (e.g., less memory usage, less power consumption, etc.), and with less exposure to possible misuse of the system or possible mis-appropriation of information contained within the system in comparison with conventional techniques and technologies. In addition, if the authorized user is within view of someone else, the authorized user can access the limited-access functionality without worrying about the possibility of disclosing their password (or other alphanumeric access credential), thereby improving security considerations.

It should be appreciated that, in at least some embodiments, the one or more authorized-access applications (or functionalities) 122 and the one or more limited-access applications (or functionalities) 126 are not mutually exclusive. For example, with reference to FIG. 1, in some embodiments, a web browser application (e.g. Internet Explorer®) or a communication application (e.g. Skype®) may be included within both the one or more limited-access applications 126 and the one or more authorized-access applications 122.

Similarly, in at least some embodiments, the limited-access data 128 is not necessarily limited to being accessed by limited-access users or limited-access applications, but may also be accessible to authorized-access users or authorized-access applications. For example, if a limited-access user performs an Internet search using a system's limited-access Internet search functionality, the search results and web pages accessed may be cached in the limited-access data 128 of the limited-access portion 125 of the memory 110, and in at least some embodiments, if an authorized-access user subsequently performs another Internet search, the previously-cached search results and web pages may be accessible for retrieval and display by the system to the authorized-access user. In further embodiments, other information or types of information stored in the limited-access data 128 may be accessible by authorized-access users or authorized-access applications, including, for example, browsing history, stored favorites, information retrieved from other devices, calculation results, or any other suitable information or information type.

Furthermore, in at least some embodiments, the limited-access data 128 is not necessarily limited to being generated by limited-access users or limited-access applications, but may also be generated by authorized-access users or authorized-access applications. For example, if an authorized-access user performs an Internet search using a system's authorized-access Internet search functionality, the search results and web pages accessed may be stored in the limited-access data 128 of the limited-access portion 125 of the memory 110, thereby allowing subsequent access by limited-access users or limited-access applications. Of course, limited-access users and limited-access applications may still be prohibited from accessing information stored in the authorized-access data 124 within the authorized-access portion 120 of the memory 110.

Techniques and technologies for providing limited-access functionality accessible at a login screen in accordance with the present disclosure are not necessarily limited to the particular embodiments described above with reference to FIGS. 1-2. In the following description, additional embodiments of techniques and technologies for providing limited functionality access at a login screen will be described. It should be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional, or may be variously combined to create still further embodiments. In the following discussion of additional embodiments, common reference numerals may be used to refer to elements introduced above, and for the sake of brevity, descriptions of previously-introduced elements may be omitted so that emphasis can be properly placed on new or varying aspects of such additional embodiments.

Figure 3:
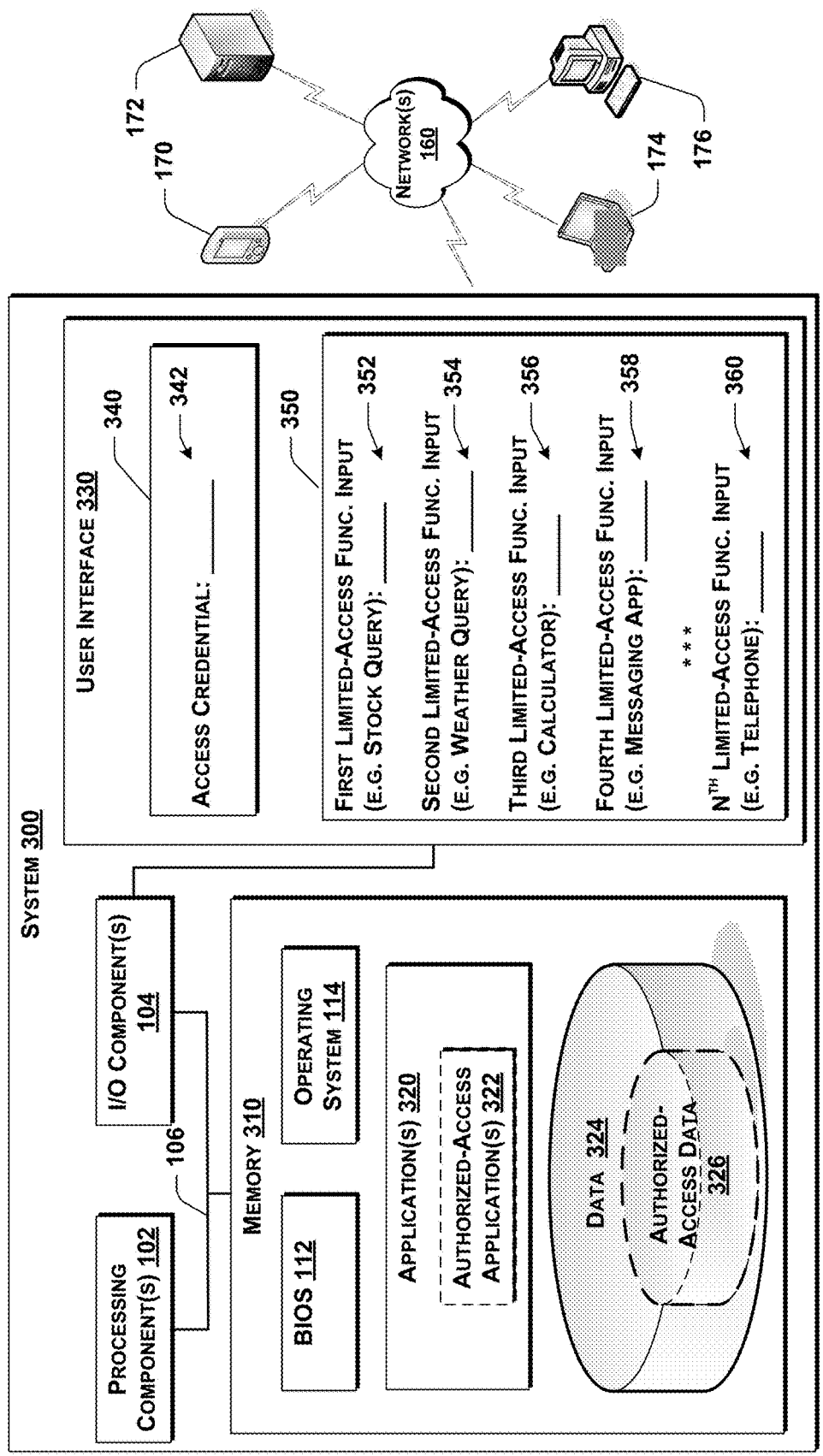
FIG. 3 shows another embodiment of a system for providing limited-access functionality accessible at a login screen.

FIG. 3 shows another embodiment of a system 300 for providing limited-access functionality accessible at a login screen. In this embodiment, the system 300 includes one or more processing components 102 and one or more input/output (I/O) components 104 coupled to a memory 310 by a bus 106. The memory 310 includes a basic input/output system (BIOS) 112 and an operating system 114.

In the embodiment shown in FIG. 3, one or more applications 320 are stored in the memory 310. The one or more applications 320 include a subset of one or more authorized-access applications 322. Similarly, data 324 are stored in the memory 310, and the data 324 includes a subset of authorized-access data 326.

The system 300 further includes a user interface 330 operatively coupled to the one or more I/O components 104. In the embodiment shown in FIG. 3, the user interface 330 displays a login screen (or lock screen) that includes a login access 340 having an access credential portion 342. The login access 340 enables a user to provide a single credential (e.g. password, PIN, etc.) to gain access to the full functionality (or set of functionalities) of the system 300, including the one or more authorized-access applications 322 and the authorized-access data 326.

As further shown in FIG. 3, the user interface 330 further includes a limited-access functionality access portion 350 that provides immediate access to several limited-access functionalities of the system 300. More specifically, in the embodiment shown in FIG. 3, the limited-access functionality access portion 350 of the user interface 330 includes a first limited-access functionality input 352 (e.g. stock market query), a second limited-access functionality input 354 (e.g. weather query), a third limited-access functionality input 356 (e.g. calculator), a fourth limited-access functionality input 358 (e.g. messaging application), and an $n^{th}$ limited-access functionality input 358 (e.g. telephone functionality). By accessing the system 300 via the limited-access functionality access portion 350, a limited-access user is only permitted to access a limited functionality (or set of functionalities) of the system 300. More specifically, the limited-access user may access the one or more applications 320 other than one or more authorized-access applications 322 (i.e. the limited-access user is prohibited from accessing the one or more authorized-access applications 322). Similarly, the limited-access user may access the data 324 other than the limited-access data 326 (i.e. the limited-access user is prohibited from accessing the authorized-access data 326).

Again, the system 300 providing limited-access functionality accessible at a login screen may provide substantial operational improvements in comparison with conventional technologies. By providing the user interface 330 having the limited-access functionality access portion 350 that provides immediate access to numerous limited-access functionalities of the system 300 at a login screen of a system, a user of the system 300 is not required to first enter login credentials and start the desired limited-access functionality before the desired limited-access operations can be performed. This improved accessibility may provide improved usability of the system 300 by eliminating several operations associated with receiving and verifying a user's access credentials (e.g. eliminating at least operations 206 through 210 of FIG. 2) before a user can access the desired functionalities. In this way, the system 300 may actually only require the performance of the operations associated with receiving and verifying an authorized-user's access credentials when an authorized-user desires to access the subset of one or more authorized-access applications 322 or the subset of authorized-access data 326. In addition, the elimination of the operations associated with receiving and verifying a user's access credentials (e.g. eliminating at least operations 206 through 210 of FIG. 2) may reduce power consumption, which may be particularly advantageous for mobile or hand-held devices.

Figure 4:
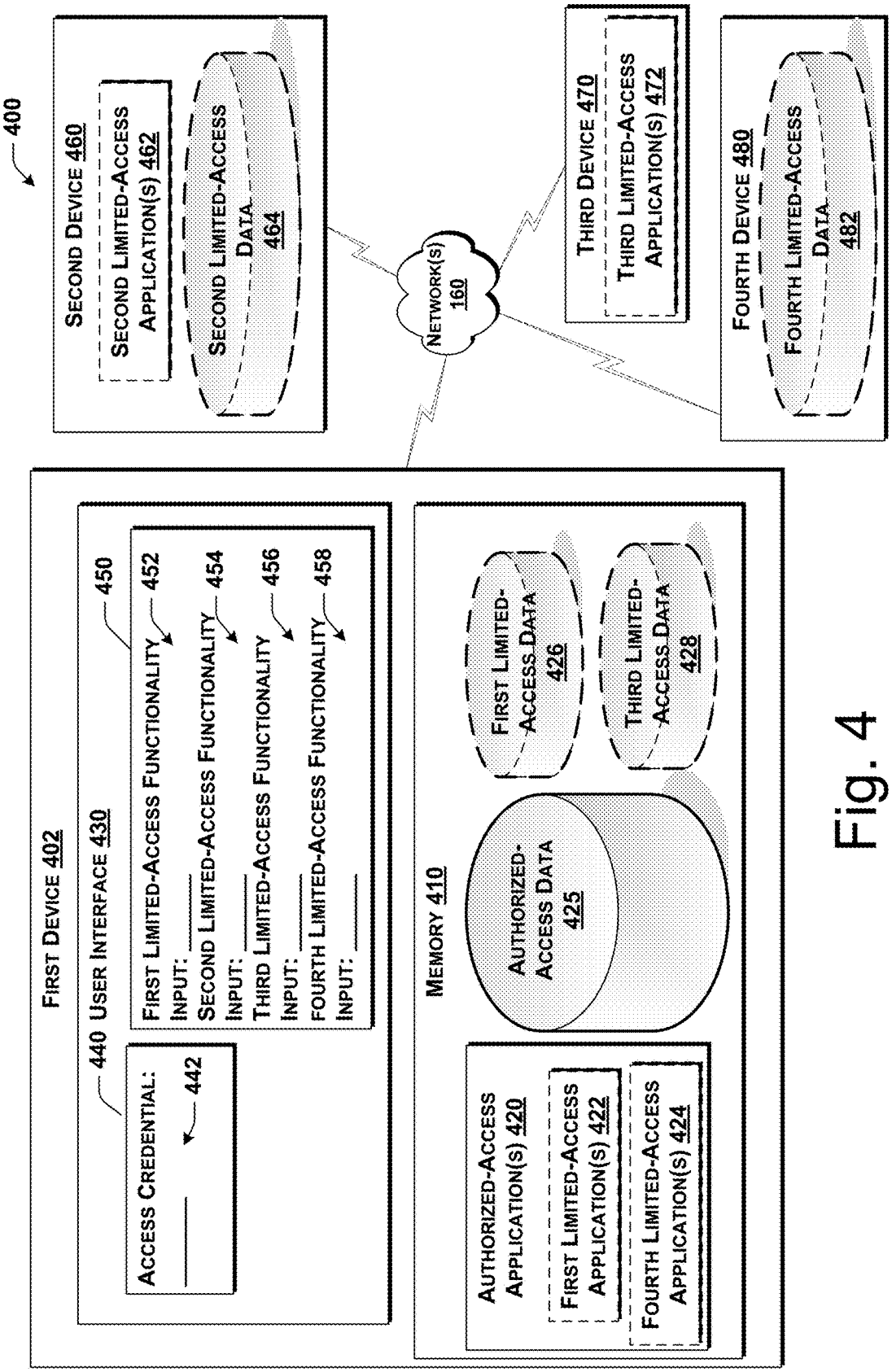
FIG. 4 shows an embodiment of a networked system for providing limited-access functionality accessible at a login screen.

FIG. 4 shows an embodiment of a networked system 400 for providing limited-access functionality accessible at a login screen. In this embodiment, the system 400 includes a first device 402 operatively coupled to a second device 460, a third device, and a fourth device 480 by one or more networks 160. The first device 402 includes a user interface 430 and a memory 410. Additional components which may provide operability of the first device 402 (and second, third, and fourth devices 460, 470, 480) are omitted from FIG. 4 for the sake of clarity (e.g. processing components 102, input/output (I/O) components 104, bus 106, basic input/output system (BIOS) 112, operating system 114, etc.).

In the embodiment shown in FIG. 4, the memory 410 of the first device 402 includes one or more authorized-access applications 420, and authorized-access data 425. The user interface 430 of the first device 402 displays a login screen (or lock screen) that includes an authorized access 440 having an access credential portion 442. As noted above, the authorized access 340 enables a user to provide a single credential (e.g. password, PIN, etc.) to gain access to an authorized functionality (or set of authorized functionalities) of the first device 402, including the one or more authorized-access applications 420 and the authorized-access data 425. In the embodiment illustrated in FIG. 4, a first limited-access application 422 and a fourth limited-access application 424 are a subset of the one or more authorized-access applications 420, and are therefore available to an authorized user after the authorized user has successfully logged in to the first device 402 by entering the appropriate access credential 442.

As further shown in FIG. 4, the user interface 430 further includes a limited-access functionality access portion 450 that provides immediate access to several limited-access functionalities of the system 400. More specifically, in the embodiment shown in FIG. 4, the limited-access functionality access portion 450 of the user interface 430 includes a first limited-access functionality input 452, a second limited-access functionality input 454, a third limited-access functionality input 456 (e.g. calculator), and a fourth limited-access functionality input 458.

In operation, when a limited-access user accesses the system 400 via the limited-access functionality access portion 450, the limited-access user is only permitted to access a limited-access functionality (or set of limited-access functionalities) of the system 400. More specifically, by providing the first limited-access functionality input 452, the limited-access user may access a first limited-access application 422 stored on the first device 402, and first limited-access data 426 stored on the first device 402, but is prohibited from accessing the authorized-access data 425 or the other authorized-access applications 420 that are not also limited-access applications (i.e. the limited-access user is prohibited from accessing applications 420 other than first limited-access application 422 and fourth limited-access application 424).

Similarly, when the limited-access user provides the second limited-access functionality input 454 on the user interface 430, the limited-access user may invoke a second limited-access application 462 and second limited-access data 464 stored on the second device 460 via the one or more networks 160. When the limited-access user provides the third limited-access functionality input 456 on the user interface 430, the limited-access user may invoke a third limited-access application 472 stored on the third device 470 via the one or more networks 160, and third limited-access data 428 stored on the memory 410 of the first device 402. Further, when the limited-access user provides the fourth limited-access functionality input 458 on the user interface 430, the limited-access user may invoke a fourth limited-access application 424 stored on the memory 410 of the first device 402, and fourth limited-access data 482 stored on the fourth device 480 via the one or more networks 160.

The above-described operation of the system 400 demonstrates that the system 400 providing limited-access functionality accessible at a login screen may be implemented in a distributed environment. Such systems 400 may enable access to distributed functionalities that may reside, either partially or wholly, on devices other than the particular device that a user is using to access such functionalities. It will be appreciated that the system 400 shown in FIG. 4 is not intended to be exhaustive of all the possible ways in which functionalities and/or data (limited-access or authorized-access) may be distributed throughout a system having a plurality of devices, and that additional embodiments may be conceived based on the subject matter disclosed herein. For example, the one or more authorized-access applications may be partially or wholly distributed in a manner comparable to the limited-access applications. Overall, the above-noted operational improvements in operating efficiency and reduced resource usage may be readily achieved in a variety of techniques and technologies providing limited functionality access at a login screen implemented in a distributed environment.

Figure 5:
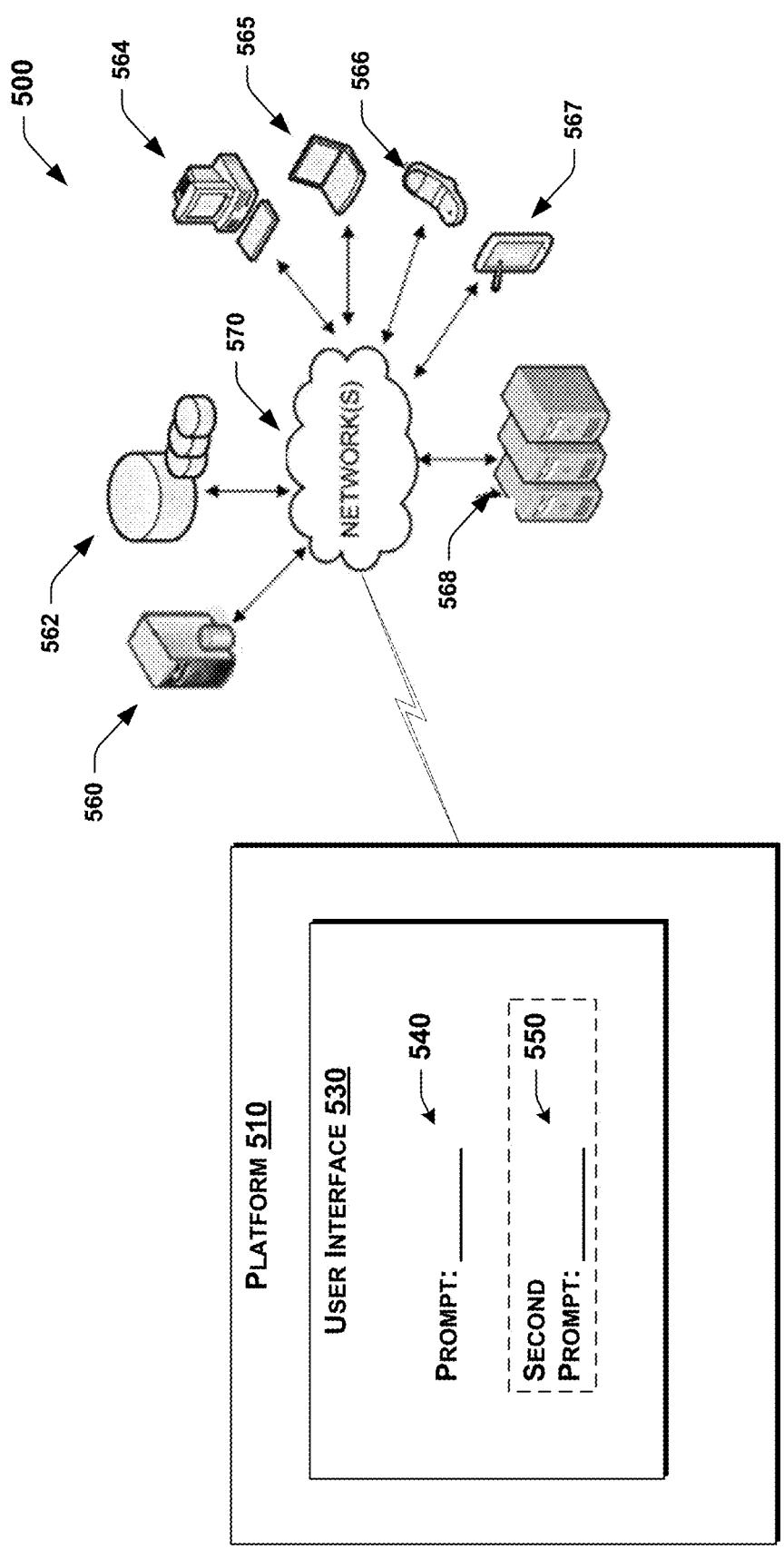
FIG. 5 shows another embodiment of a networked system for providing limited-access functionality accessible at a login screen.

FIG. 5 is a diagram of another embodiment of a networked environment 500 for providing limited-access functionality accessible at a login screen. The networked environment 500 shown in FIG. 5 may include one or more of the various components or aspects described above with respect to FIGS. 1-4 (or shown or described elsewhere herein), however, such components or aspects may not be shown in FIG. 5 for the sake of clarity and brevity.

In this embodiment, the example networked environment 500 includes a first platform 510 configured to provide limited functionality access at a login screen. More specifically, the first platform 510 includes a user interface 530 having a user input portion 540. The user input portion 540 is configured to receive input to enable a user to access one or more authorized-access functionalities by providing one or more access credentials (e.g. password, alphanumeric string, etc.), or alternately, a user may access one or more limited-access functionalities of the environment 500 by providing an appropriate limited-access input to the user input portion 540. Thus, the user input portion 540 enables a user to provide input at a single location, and the input may either be input to a limited-access functionality or one or more access credentials that may be used to grant access to an authorized-access functionality.

For example, in at least some embodiments, the user input portion 540 may provide a prompt requesting a limited-access functionality input or one or more access credentials (e.g. "search the web or type in your password," "enter stock quote of interest or enter login information," "enter phone number or userid," etc.). Upon receiving an input via the user input portion 540, the platform 510 (or other suitable portion(s) of the environment 500) analyzes the input and grants access to one or more appropriate functionalities or data.

More specifically, in at least some embodiments, if the environment 500 receives an input that it interprets as an input to a limited-access functionality (e.g. "driving directions to Zips"), then the environment 500 may perform the limited-access functionality (e.g. perform a web search and provide the requested driving directions, provide the requested stock quote information, attempt a telephone connection to the input telephone number, etc.). Alternately, if the environment 500 received an authorized password or other suitable credential, then it may provide access to one or more authorized-access functionalities or data.

In at least some embodiments, the user input portion 540 may be configured to assume that all users are limited-access users until otherwise indicated. For example, a prompt of the user input portion 540 may request an input for a limited-access functionality (e.g. "Search the Web," "enter weather query," "enter phone number," etc.). Upon receiving an input via the user input portion 540, the platform 510 (or other suitable portion(s) of the environment 500) may analyze the input, determine that it is a limited-access input, and grant access to one or more limited-access functionalities or data. On the other hand, if the environment 500 determines that the received input requires user authorization (e.g. request to text message, request to access authorized-access functionality or data, etc.), then the environment 500 may further prompt the user for an authorized access credential before performing one or more authorized-access operations. For example, as shown in FIG. 5, in at least some embodiments, a second prompt (or login prompt) 550 may appear (e.g. as a pop-up window, etc.) that prompts the user for one or more access credentials that may be needed to perform the desired authorized-access functionality.

In still further embodiments, the user input portion 540 may be configured to assume that all users are authorized-access users until otherwise indicated. For example, the prompt of the user input portion 540 may request one or more access credentials that enable access to authorized-access functionality or data (e.g. "speak or type password," "provide thumbprint," etc.), however, the user interface 530 may be configured to include a radio button (e.g. the user input portion 540) or other suitable switching component that allows a user to select between a login option and a limited-access functionality option (e.g. "search the web," etc.). In at least some embodiments, the capability of the environment 500 to provide limited-access functionality without requiring one or more authorized-access credentials may be hidden until a user explicitly chooses the radio button option or other indication to enter a limited-access mode of operation.

As described above (e.g. with reference to FIG. 4), one or more applications or data that may be used for performance of the one or more limited-access functionalities of the environment 500 (or the one or more authorized-access functionalities of the environment 500) may be distributed partially or wholly throughout the various devices of the networked environment 500. In at least some implementations, the first platform 510 may be a desktop computer, laptop computer, cellular telephone, tablet, Personal Data Assistant (PDA), a server, a computer system, or any other suitably configured platform.

As further shown in FIG. 5, the networked environment 500 may include one or more database servers 560, data stores 562, desktop computers 564, laptop computers 565, communication devices 566 (e.g., cell phones, smart phones, personal data assistants, etc.), tablet (or notebook) computers 567, or servers 568, and such devices may be operatively coupled to the platform 510 via one or more networks 570 (e.g., a LAN, WAN, a local communication system, a global communication system, the Internet, a cellular communication system, a telephonic communication system, etc.).

The one or more networks 570 may comprise any suitable topology of servers, clients, Internet service providers, or other suitable communication media, and in various alternate implementations, may have a static or dynamic topology. The one or more networks 570 may include a secure network (e.g., an enterprise network), an unsecure network (e.g., a wireless open network, the Internet, etc.), and may also coordinate communication over other networks (e.g., PSTN, cellular networks, etc.). By way of example, and not limitation, the one or more networks 570 may be coupled by any suitable communication technologies, including, for example, electromagnetic signals, acoustic signals, RF signals, infrared signals and any other suitable communication technologies or signals.

Figure 6:
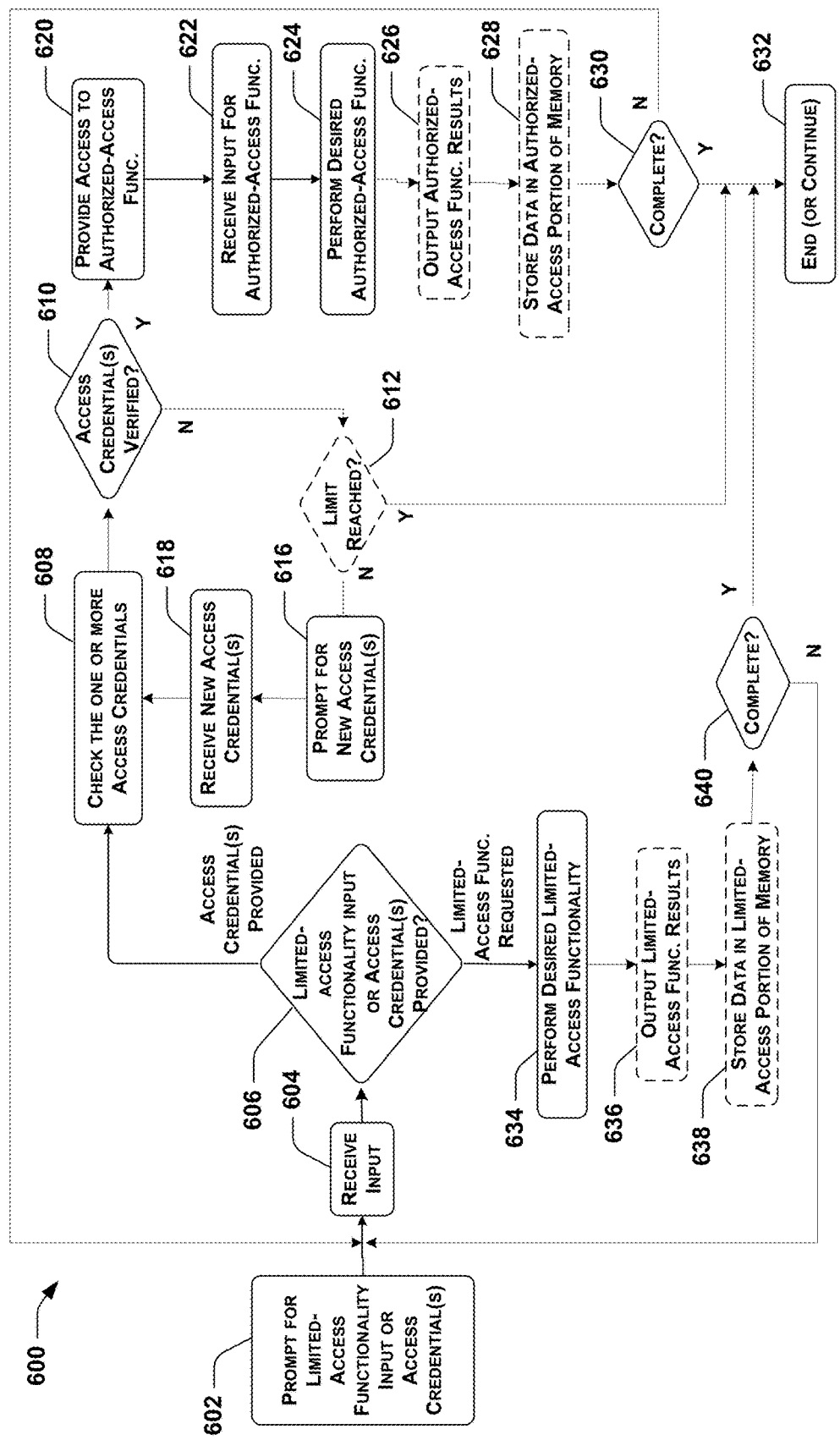
FIG. 6 shows another embodiment of a process for providing limited-access functionality accessible at a login screen.

FIG. 6 shows another embodiment of a process 600 for providing limited-access functionality accessible at a login screen (or "lock screen"). In this embodiment, the process 600 includes prompting for limited-access functionality input or one or more access credentials at 602. The process 600 receives input at 604, and at 606, the process 600 determines whether a limited-access functionality input or one or more access credential(s) have been provided.

If it is determined (at 606) that one or more access credential(s) have been provided, then the process 600 proceeds to check the one or more access credentials at 608. As noted above, the one or more access credentials received (at 604) may be a single access credential (e.g. a PIN, password, alphanumeric sequence, biometric input, etc.) or a plurality of access credentials (e.g. username and password, user id and PIN, etc.). In at least some embodiments, the one or more access credentials may be checked (at 608) by performing pattern recognition, by comparing the received access credential(s) with one or more reference values stored in memory, or by any other suitable techniques.

As further shown in FIG. 6, a determination is made at 610 whether the one or more access credentials have been successfully verified so that authorized access may be granted. If it is determined that the one or more access credentials have not been successfully verified (at 610), then the process 600 may determine whether a limit of unsuccessful attempts has been reached at 612. If it is determined (at 612) that a limit of unsuccessful attempts has not been reached, then the process 600 prompts for one or more new access credentials at 616, receives one or more new access credentials at 618, and then returns to checking the one or more access credentials at 608, and determining whether the one or more access credentials are verified at 610. These operations (prompting at 616, receiving at 618, checking at 608, determining at 610) may be repeated until the access credentials are successfully verified (at 610) or until the limit of unsuccessful access attempts has been reached (at 612). In the embodiment shown in FIG. 6, if the limit of unsuccessful access attempts has been reached (at 612), then the process 600 may deny access to the requested authorized-access operations by bypassing such operations and proceeding to end or continue to other operations at 632.

When the one or more access credentials are successfully verified (at 610), the process 600 provides access to one or more authorized-access functionalities at 620. As noted above, the one or more authorized-access functionalities may involve one or more authorized-access applications or authorized-access data that may be appropriate for use by an authorized user of a system. As further shown in FIG. 6, input is received (e.g. from an authorized-access user) for performing a desired authorized-access functionality at 622, and the desired functionality is performed at 624 (e.g. the message is sent to the desired recipients). With reference to FIG. 5, the authorized-access functionality performed at 624 may involve communications with one or more other devices (e.g. devices 560 through 568), either directly or indirectly via one or more networks 570. In at least some embodiments, the process 600 may optionally include outputting one or more results of the limited-access functionality at 626 (e.g. displaying calculation results, message confirmation, etc.), and may also optionally include storing data in an authorized-access portion of memory at 628 (e.g. storing calculation results, message, browsing information, etc.).

In the embodiment shown in FIG. 6, the process 600 determines whether the process 600 is complete at 630. If the process 600 determines (at 630) that it is not complete, such as by detecting that one or more additional inputs are being provided by a user (e.g. detecting that a user is entering additional input via the user input portion 540 of the user interface 530 of the platform 510), then the process 600 returns to receiving input at 604. Alternately, if the process 600 determines (at 630) that it is complete, then the process 600 ends or continues to other operations at 632.

Returning now to the determination at 606 of FIG. 6, if it is determined (at 606) that an input for a limited-access functionality has been provided, then the process 600 performs the limited-access functionality at 634 (e.g. conducts an Internet search for driving directions, places a telephone call, etc.). In at least some embodiments, the process 600 may output one or more results of performing the limited-access functionality at 636 (e.g. displaying driving directions, displaying search results, etc.). Similarly, in at least some embodiments, the process 600 may optionally store data in a limited-access portion of memory at 638 (e.g. store search query, number called, time of access, etc.).

Again, after performing the desired limited-access functionality (at 634), the process 600 determines whether the process 600 is complete at 640. If the process 600 determines (at 640) that it is not complete, such as by detecting that one or more additional inputs are being provided by a user (e.g. detecting that a user is entering additional input via the user input portion 540 of the user interface 530 of the platform 510), then the process 600 returns to receiving input at 604, and continued to perform the above-described operations using new input. Alternately, if the process 600 determines (at 640) that it is complete, then the process 600 ends or continues to other operations at 632.

Figure 7:
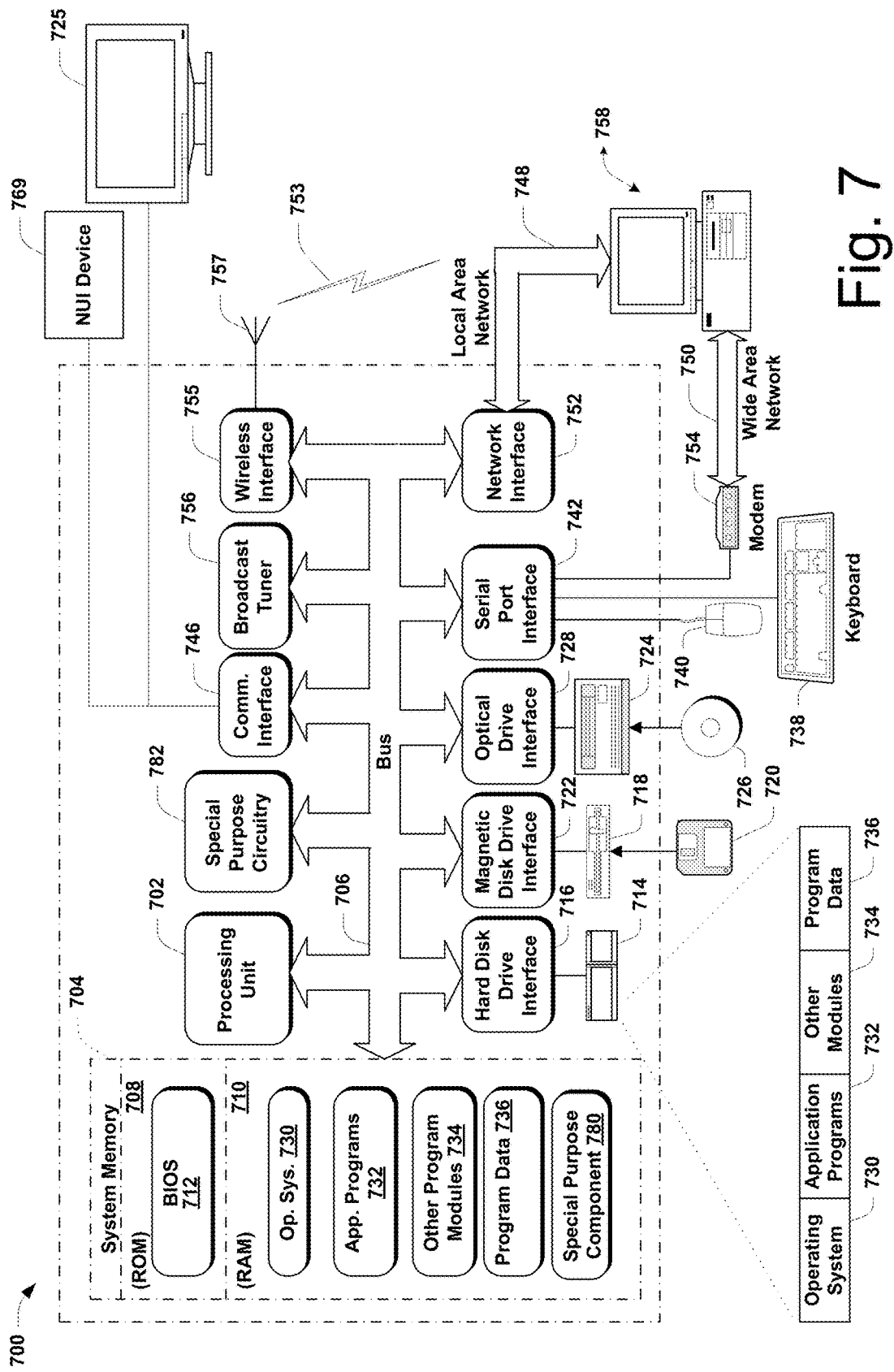
FIG. 7 shows a diagram of an embodiment of a computer system environment for providing limited-access functionality accessible at a login screen.

The foregoing description of techniques and technologies for providing limited-access functionality accessible at a login screen may be implemented on a wide variety of devices and platforms. For example, FIG. 7 is a diagram of an embodiment of a computer system environment 700 for providing limited-access functionality accessible at a login screen. As shown in FIG. 7, the example computer system environment 700 includes one or more processors (or processing units) 702, special purpose circuitry 782, memory 704, and a bus 706 that operatively couples various system components, including the memory 704, to the one or more processors 702 and special purpose circuitry 782 (e.g., ASIC, FPGA, etc.).

The bus 706 may represent one or more of any of several types of bus structures, including a memory bus or memory controller, a peripheral bus, an accelerated graphics port, and a processor or local bus using any of a variety of bus architectures. In at least some implementations, the memory 704 includes read only memory (ROM) 708 and random access memory (RAM) 710. A basic input/output system (BIOS) 712, containing the basic routines that help to transfer information between elements within the system 700, such as during start-up, is stored in ROM 708.

The example system environment 700 further includes a hard disk drive 714 for reading from and writing to a hard disk (not shown), and is connected to the bus 706 via a hard disk driver interface 716 (e.g., a SCSI, ATA, or other type of interface). A magnetic disk drive 718 for reading from and writing to a removable magnetic disk 720, is connected to the system bus 706 via a magnetic disk drive interface 722. Similarly, an optical disk drive 724 for reading from or writing to a removable optical disk 726 such as a CD ROM, DVD, or other optical media, connected to the bus 706 via an optical drive interface 728. The drives and their associated computer-readable media may provide nonvolatile storage of computer readable instructions, data structures, program modules and other data for the system environment 700. Although the system environment 700 described herein employs a hard disk, a removable magnetic disk 720 and a removable optical disk 726, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 700 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include propagating (or transitory) signals.

As further shown in FIG. 7, a number of program modules may be stored on the memory 704 (e.g., the ROM 708 or the RAM 710) including an operating system 730, one or more application programs 732, other program modules 734, and program data 736 (e.g., the data store 720, image data, audio data, three dimensional object models, etc.). Alternately, these program modules may be stored on other computer-readable media, including the hard disk, the magnetic disk 720, or the optical disk 726. For purposes of illustration, programs and other executable program components, such as the operating system 730, are illustrated in FIG. 7 as discrete blocks, although it is recognized that such programs and components reside at various times in different storage components of the system environment 700, and may be executed by the processor(s) 702 or the special purpose circuitry 782 of the system environment 700.

A user may enter commands and information into the system environment 700 through input devices such as a keyboard 738 and a pointing device 740. Other input devices (not shown) may include a microphone, joystick, game pad, satellite dish, scanner, or the like. Still other input devices, such as a Natural User Interface (NUI) device 769, or user interface 725, include or involve one or more aspects of a Natural User Interface (NUI) that enables a user to interact with the system environment 700 in a "natural" manner, free from artificial constraints imposed by conventional input devices such as mice, keyboards, remote controls, and the like. For example, in at least some embodiments, the NUI device 769 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 702 and special purpose circuitry 782 through an interface 742 or a communication interface 746 (e.g. video adapter) that is coupled to the system bus 706. A user interface 725 (e.g., display, monitor, or any other user interface device) may be connected to the bus 706 via an interface, such as a video adapter 746. In addition, the system environment 700 may also include other peripheral output devices (not shown) such as speakers and printers.

The system environment 700 may operate in a networked environment using logical connections to one or more remote computers (or servers) 758. Such remote computers (or servers) 358 may be a personal computer, a server, a router, a network PC, a peer device or other common network node. The logical connections depicted in FIG. 7 include one or more of a local area network (LAN) 748 and a wide area network (WAN) 750. Such networking environments are commonplace in offices, enterprise-wide computer networks, intranets, and the Internet. In this embodiment, the system environment 700 also includes one or more broadcast tuners 756. The broadcast tuner 756 may receive broadcast signals directly (e.g., analog or digital cable transmissions fed directly into the tuner 756) or via a reception device (e.g., via an antenna 757, a satellite dish, etc.).

When used in a LAN networking environment, the system environment 700 may be connected to the local area network 748 through a network interface (or adapter) 752. When used in a WAN networking environment, the system environment 700 typically includes a modem 754 or other means (e.g., router) for establishing communications over the wide area network 750, such as the Internet. The modem 754, which may be internal or external, may be connected to the bus 706 via the serial port interface 742. Similarly, the system environment 700 may exchange (send or receive) wireless signals 753 with one or more remote devices using a wireless interface 755 coupled to a wireless communicator 757 (e.g., an antenna, a satellite dish, a transmitter, a receiver, a transceiver, a photoreceptor, a photodiode, an emitter, a receptor, etc.).

In a networked environment, program modules depicted relative to the system environment 700, or portions thereof, may be stored in the memory 704, or in a remote memory storage device. More specifically, as further shown in FIG. 7, a special purpose component 780 may be stored in the memory 704 of the system environment 700. The special purpose component 780 may be implemented using software, hardware, firmware, or any suitable combination thereof. In cooperation with the other components of the system environment 700, such as the processing unit 702 or the special purpose circuitry 782, the special purpose component 780 may be operable to perform one or more implementations of providing limited-access functionality at a login screen as described above (e.g., example process 200 of FIG. 2, example process 600 of FIG. 6, etc.) (e.g., speech recognition component, gesture recognition component, touch recognition component, biometric identification component, etc. or combinations thereof).

Generally, application programs and program modules executed on the system environment 700 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for providing a limited-access functionality accessible at a login screen provided herein, a few representative embodiments are summarized below. It should be appreciated that the following summary of representative embodiments is not intended to be exhaustive of all possible embodiments, and that additional embodiments may be readily conceived from the disclosure of techniques and technologies for evaluating speech recognition components provided herein.

For example, in at least some embodiments, a system having a limited-access functionality accessible at a login screen may include a processing component operatively coupled to a memory; a user interface operatively coupled to the processing component; and one or more instructions stored on the memory that, when executed by the processing component, are configured to: (a) generate a login portion displayed on the user interface, the login portion configured to receive at least one user access credential to determine whether to provide access to one or more authorized-access functionalities; and (b) generate a limited-access portion displayed on the user interface concurrently with the login portion, the limited-access portion configured to provide access to at least one limited-access functionality without requiring receipt of the at least one user access credential, the at least one limited-access functionality being at least one of (i) a subset of the one or more authorized-access functionalities, or (ii) having access to less data stored in the memory than the one or more authorized-access functionalities.

In addition, in at least some embodiments of systems disclosed herein, the one or more authorized-access functionalities may include a plurality of authorized-access functionalities including the at least one limited-access functionality. Similarly, in at least some embodiments of systems disclosed herein, the memory may further include one or more authorized-access data accessible by the one or more authorized-access functionalities, the at least one limited-access functionality being unable to access the authorized-access data.

Furthermore, in at least some embodiments of systems disclosed herein, the at least one user access credential may include at least one of a password, a personal identifying number, an alphanumeric sequence, a username, or a biometric input. And in further embodiments of systems disclosed herein, the at least one limited-access functionality may include at least one of an Internet search functionality, a telephone functionality, a weather checking functionality, a stock market checking functionality, a telephone directory functionality, a personnel locator functionality, or a map functionality. Similarly, in at least some embodiments of systems disclosed herein the one or more authorized-access functionalities may include at least one of an Internet search functionality, a telephone functionality, an accounting functionality, a banking functionality, a telephone directory functionality, a messaging functionality, or a proprietary functionality.

Additionally, in at least some embodiments of systems disclosed herein, the system may further include authorized-access data stored on the memory and accessible by the one or more authorized-access functionalities, the authorized-access data not accessible by the at least one limited-access functionality. And in further embodiments of systems disclosed herein, the user interface of the system may include at least one of a touch-screen display, a voice recognition application, a keyboard, a pointing device, or a natural user interface.

In further alternate embodiments of systems disclosed herein, the memory of the system may include an authorized-access portion and a limited-access portion, and authorized-access data may be stored on the authorized-access portion of the memory and accessible by the one or more authorized-access functionalities, the authorized-access data not accessible by the at least one limited-access functionality; and limited-access data may be stored on the limited-access portion of the memory and accessible by the at least one limited-access functionality.

In addition, in at least some embodiments of systems disclosed herein, the memory may include an authorized-access portion and a limited-access portion, and authorized-access data may be stored on the authorized-access portion of the memory and accessible by the one or more authorized-access functionalities, the authorized-access data not accessible by the at least one limited-access functionality; and limited-access data may be stored on the limited-access portion of the memory and accessible by the at least one limited-access functionality.

Furthermore, in at least some embodiments of systems disclosed herein, a system may further include one or more instructions stored on the memory configured to perform at least one of the at least one limited-access functionality or at least one of the one or more authorized-access functionalities.

Alternatively, in at least some embodiments, a system may include a user interface; and a processing component operatively coupled to the user interface and configured to: perform a plurality of authorized-access functionalities, the plurality of authorized-access functionalities including at least one limited-access functionality, the at least one limited-access functionality being a subset of the plurality of authorized-access functionalities; operate the user interface to display a login portion configured to provide a query for at least one user access credential; and operate the user interface to display a limited-access functionality access portion concurrently with the display of the login portion, the limited-access functionality access portion configured to provide a query for at least one limited-access input for the at least one limited-access functionality without requiring receipt of the at least one user access credential.

In at least some embodiments of systems disclosed herein, the at least one limited-access functionality being a subset of the plurality of authorized-access functionalities includes the at least one limited-access functionality providing less functionality than a sum of functionalities of the plurality of authorized-access functionalities. In addition, in at least some embodiments of systems disclosed herein, one or more of the plurality of authorized-access functionalities is configured to access authorized-access data, the at least one limited-access functionality being prohibited from access to the authorized-access data, and wherein the at least one limited-access functionality being a subset of the plurality of authorized-access functionalities comprises: the at least one limited-access functionality providing less functionality than a sum of functionalities of the plurality of authorized-access functionalities based at least partially on the at least one limited-access functionality being prohibited from access to the authorized-access data.

Additionally, in at least some embodiments of systems disclosed herein, at least one of the processing component or the user interface are further configured to: receive the at least one user access credential as input; verify the at least one user access credential; and after verifying the at least one user access credential, provide access to the plurality of authorized-access functionalities. In at least some further embodiments, a system includes a user interface; and a processing component operatively coupled to the user interface and configured to operate the user interface to display a user input prompt; operate the user interface to receive an input; determine whether the input includes at least one authorized-access credential or at least one limited-access input for performing at least one limited-access functionality; and based at least partially on the determination: if the input includes at least one authorized-access credential, attempt to verify the at least one authorized-access credential before providing access to one or more authorized-access functionalities; and if the input includes at least one limited-access input for performing at least one limited-access functionality, provide the at least one limited-access input to the at least one limited-access functionality without requiring receipt of at least one authorized-access credential.

Similarly, in at least some embodiments, the processing component configured is further configured to: perform the at least one limited-access functionality, the at least one limited-access functionality being at least one of (i) a subset of the one or more authorized-access functionalities, or (ii) having access to less data stored in a memory than the one or more authorized-access functionalities. In addition, in some embodiments of systems disclosed herein, if the input includes at least one authorized-access credential, the processing component is further configured to: verify the at least one authorized-access credential; provide access to one or more authorized-access functionalities; operate the user interface to receive an authorized-access input; and at least partially perform at least one of the one or more authorized-access functionalities using the authorized-access input.

In addition, in at least some embodiments of systems disclosed herein, the processing component configured to operate the user interface to display a user input prompt may include a processing component configured to operate the user interface to display a login access portion, and to display a limited-access portion displayed concurrently with the login access portion.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system having a limited-access functionality accessible at a login screen, comprising:
   a processing device communicatively coupled to a memory, wherein the memory includes an authorized-access portion configured to store authorized-access data, and a limited-access portion configured to store limited-access data;
   a user interface communicatively coupled to the processing device; and
   one or more instructions stored on the memory that, when executed by the processing device, are configured to cause one or more operations including:
      generate a login portion displayed on the user interface, the login portion configured to receive at least one user access credential to determine whether to provide access to one or more authorized-access functionalities, the one or more authorized-access functionalities being configured to access authorized-access data stored on the authorized-access portion of the memory; and generate a limited-access portion displayed on the user interface concurrently with the login portion, the limited-access portion configured to provide access to at least one limited-access functionality without requiring receipt of the at least one user access credential, the at least one limited-access functionality being configured to access limited-access data stored on the limited-access portion of the memory, the at least one limited-access functionality being a subset of the one or more authorized-access functionalities wherein the at least one limited-access functionality provides less functionality than a sum of functionalities of the plurality of authorized-access functionalities based at least partially on the at least one limited-access functionality not having access to the authorized-access data stored in the authorized-access portion of the memory.

2. The system of claim 1, wherein the one or more authorized-access functionalities comprises:
a plurality of authorized-access functionalities including the at least one limited-access functionality.

3. The system of claim 1, wherein the memory further includes one or more authorized-access data accessible by the one or more authorized-access functionalities, the at least one limited-access functionality being unable to access the authorized-access data.

4. The system of claim 1, wherein the at least one limited-access functionality comprises:
a plurality of limited-access functionalities.

5. The system of claim 1, wherein the at least one user access credential comprises:
at least one of a password, a personal identifying number, an alphanumeric sequence, a username, or a biometric input.

6. The system of claim 1, wherein the at least one limited-access functionality comprises:
at least one of an Internet search functionality, a telephone functionality, a weather checking functionality, a stock market checking functionality, a telephone directory functionality, a personnel locator functionality, or a map functionality.

7. The system of claim 1, wherein the one or more authorized-access functionalities comprises:
at least one of an Internet search functionality, a telephone functionality, an accounting functionality, a banking functionality, a telephone directory functionality, a messaging functionality, or a proprietary functionality.

8. The system of claim 1, further comprising:
authorized-access data stored on the memory and accessible by the one or more authorized-access functionalities, the authorized-access data not accessible by the at least one limited-access functionality.

9. The system of claim 1, wherein the user interface comprises at least one of a touch-screen display, a voice recognition application, a keyboard, a pointing device, or a natural user interface.

10. The system of claim 1, further comprising:
one or more instructions stored on the memory configured to perform at least one of the at least one limited-access functionality or at least one of the one or more authorized-access functionalities.

11. A system, comprising:
a user interface; and
a processing device communicatively coupled to the user interface and configured to:
perform a plurality of authorized-access functionalities, the plurality of authorized-access functionalities including at least one limited-access functionality, wherein one or more of the plurality of authorized-access functionalities is configured to access authorized-access data, the at least one limited-access functionality being prohibited from access to the authorized-access data, the at least one limited-access functionality being a subset of the plurality of authorized-access functionalities wherein such that the at least one limited-access functionality provides less functionality than a sum of functionalities of the plurality of authorized-access functionalities based at least partially on the at least one limited-access functionality being prohibited from access to the authorized-access data;
operate the user interface to display a login portion configured to provide a query for at least one user access credential; and
operate the user interface to display a limited-access functionality access portion concurrently with the display of the login portion, the limited-access functionality access portion configured to provide a query for at least one limited-access input for the at least one limited-access functionality without requiring receipt of the at least one user access credential.

12. The system of claim 11, wherein at least one of the processing device or the user interface are further configured to:
receive the at least one user access credential as input;
verify the at least one user access credential; and
after verifying the at least one user access credential, provide access to the plurality of authorized-access functionalities.

13. A system, comprising:
a user interface; and
a processing device communicatively coupled to the user interface and configured to:
operate the user interface to display a login access portion, and to display a limited-access portion concurrently with the login access portion;
operate the user interface to receive an input;
determine whether the input includes at least one authorized-access credential or at least one limited-access input for performing at least one limited-access functionality; and
based at least partially on the determination:
if the input includes at least one authorized-access credential, attempt to verify the at least one authorized-access credential before providing access to one or more authorized-access functionalities, wherein at least one of the one or more authorized-access functionalities is configured to access authorized-access data; and
if the input includes at least one limited-access input for performing at least one limited-access functionality, provide the at least one limited-access input to the at least one limited-access functionality without requiring receipt of at least one authorized-access credential, the at least one limited-access functionality providing less functionality than a sum of functionalities of the one or more authorized-access functionalities based at least partially on the at least one limited-access functionality being prohibited from access to the authorized-access data.

14. The system of claim 13, wherein the processing device configured is further configured to:

perform the at least one limited-access functionality, the at least one limited-access functionality being at least one of (i) a subset of the one or more authorized-access functionalities, or (ii) having access to less data stored in a memory than the one or more authorized-access functionalities.

15. The system of claim 13, wherein if the input includes at least one authorized-access credential, the processing device is further configured to:
  verify the at least one authorized-access credential;
  provide access to one or more authorized-access functionalities;
  operate the user interface to receive an authorized-access input; and
  at least partially perform at least one of the one or more authorized-access functionalities using the authorized-access input.

* * * * *